(12) United States Patent
Kwak et al.

(10) Patent No.: US 8,301,303 B2
(45) Date of Patent: Oct. 30, 2012

(54) ROBOT AND METHOD OF CONTROLLING THE SAME

(75) Inventors: Ho Seong Kwak, Seoul (KR); Woong Kwon, Seongnam-si (KR); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 436 days.

(21) Appl. No.: 12/591,120

(22) Filed: Nov. 9, 2009

(65) Prior Publication Data

US 2010/0161117 A1 Jun. 24, 2010

(30) Foreign Application Priority Data

Dec. 22, 2008 (KR) ........................ 10-2008-0131033

(51) Int. Cl.
*G05B 19/18* (2006.01)

(52) U.S. Cl. ...................................................... 700/245

(58) Field of Classification Search .................. 700/245, 700/250, 253, 254, 258, 260–262, 279; 901/1, 901/2, 8–11, 14–18, 27–30, 34–36, 46, 48
See application file for complete search history.

(56) References Cited

U.S. PATENT DOCUMENTS

| 8,024,070 B2 * | 9/2011 | Sano et al. ..................... 700/254 |
| 2005/0075755 A1 * | 4/2005 | Takenaka et al. ............. 700/245 |
| 2007/0016329 A1 * | 1/2007 | Herr et al. ..................... 700/250 |
| 2007/0260355 A1 * | 11/2007 | Morimoto et al. ............ 700/245 |

* cited by examiner

*Primary Examiner* — Mary Cheung

(74) *Attorney, Agent, or Firm* — Staas & Halsey LLP

(57) ABSTRACT

Disclosed is a method of defining control angles to use a limit cycle in order to balance a biped walking robot on a three-dimensional space. In order to balance an FSM-based biped walking robot right and left on a three-dimensional space, limit cycle control angles to balance the robot according to states of the FSM-based robot are set on the three-dimensional space, and the limit cycle control angles on the three-dimensional space are controlled using a sinusoidal function to allow relations between the control angles and control angular velocities to form a stable closed loop within a limit cycle.

15 Claims, 10 Drawing Sheets

ROBOT AND METHOD OF CONTROLLING THE SAME

CROSS-REFERENCE TO RELATED APPLICATIONS

This application claims the benefit of Korean Patent Application No. 2008-0131033, filed Dec. 22, 2008, in the Korean Intellectual Property Office, the disclosure of which is incorporated herein by reference.

BACKGROUND

1. Field

The present invention relates to a robot and a method of controlling the same, and more particularly, to a method of defining control angles to use a limit cycle in order to balance a biped walking robot on a three-dimensional space.

2. Description of the Related Art

In general, machines, which conduct motions similar to those of a human being using an electrical or magnetic action, are known as robots. Early robots were industrial robots, such as manipulators or transfer robots, for work automation and unmanned operation in a production field. These robots performed dangerous work, simple repetitive work, or work requiring large forces, in place of a human being. Recently, biped walking robots, which have a joint system similar to that of a human being, live together with the human being in human working and living spaces, and walk with two feet, have been vigorously researched and developed.

Methods of controlling the walking of a biped robot include a position-based zero moment point (ZMP) control method, and a torque-based finite state machine (FSM) control method. The FSM control method refers to all methods which use a torque control but do not use a ZMP control. In the FSM control method, finite states of the biped robot are defined in advance, and then the finite states of the biped robot are sequentially changed while walking, thus allowing the biped robot to properly walk.

The above FSM-based biped robot uses a limit cycle in order to balance itself on a two-dimensional space. The limit cycle refers to a trajectory movement, which forms a closed loop according to time on the two-dimensional space. When values of a function according to time form a random route in the closed loop as time passes by, the closed loop is referred to as the limit cycle (with reference to FIG. 1).

The limit cycle is divided into stable regions and unstable regions, and performs a nonlinear control. A region of the limit cycle, which is in a regular closed loop range, is referred to as a stable region, and a region of the limit cycle, which is not in the regular closed loop range but diverges radially or converges into one point, is referred to as an unstable region. On the assumption that a biped robot is on a two-dimensional space, control angles are defined by the center of gravity of the biped robot and the foot of the robot contacting the ground and the relationships between the control angles and their differential components, i.e., control angular velocities, are expressed on the two-dimensional space, thus obtaining the limit cycle of FIG. 1. Since the vector of the foot of a biped robot on the two-dimensional space is perpendicular to the ground and the center of the gravity of the biped robot is defined on the two-dimensional space, it is easy to define limit cycle control angles on the two-dimensional space. However, since a biped robot on a three-dimensional space has joints with different positions and directions, it is not easy to define limit cycle control angles of the biped robot on the three-dimensional space. Further, although results of a two-dimensional simulation are combined on a three-dimensional simulation, all data cannot be expressed, and thus in order to balance the biped robot on the three-dimensional space, where the biped robot actually walks, control angles to use the limit cycle should be defined.

SUMMARY

Therefore, one aspect of the invention is to provide a method of defining control angles to use a limit cycle in order to balance a FSM-based biped robot on a three-dimensional space.

Additional aspects and/or advantages will be set forth in part in the description which follows and, in part, will be apparent from the description, or may be learned by practice of the invention.

The foregoing and/or other aspects of the present invention are achieved by providing a method of controlling a robot including setting limit cycle control angles to balance the robot on a three-dimensional space; and controlling the set limit cycle control angles on the three-dimensional space using a sinusoidal function to balance the robot within a limit cycle.

The robot may be a finite state machine (FSM)-based biped walking robot.

The limit cycle control angles may be set in consideration of position, direction, tilt data of the robot according to states of the FSM.

The states of the FSM may include a double support (DS) state, in which the robot is supported with both feet thereof, a single support right (SS(R)) state, in which the robot is supported only with its right foot, and a single support left (SS(L)) state, in which the robot is supported only with its left foot.

The setting of the limit cycle control angles may include defining a virtual plane on the basis of a torso of the robot, and generating a contact point on the virtual plane by projecting a contact point of the robot with the ground onto the virtual plane; generating a contact point on the space using positions of the contact point on the plane and the center of gravity of the robot; generating vectors on the space using positions of the contact point on the space, the contact point on the plane, and the center of gravity; and obtaining the limit cycle control angles using the vectors on the space.

The contact point on the plane and the contact point on the space may correspond to the contact point of the robot with the ground. The limit cycle control angles may arise from the contact point of the robot with the ground, and control ankles of the robot. The limit cycle control angles may control the angles of the ankles to allow the limit cycle to form a stable closed loop. The controlling of the limit cycle control angles using the sinusoidal function may be achieved such that the limit cycle forms a stable closed loop according to the states of the FSM.

The control of the limit cycle control angles using the sinusoidal function may be achieved such that relations of the limit cycle control angles and control angular velocities, which are differential components of the limit cycle control angles, form the limit cycle in the stable closed loop on the space.

The angles of the ankles of the robot may be controlled within the limit cycle by controlling the limit cycle control angles using the sinusoidal function.

The foregoing and/or other aspects of the present invention are achieved by providing a robot including ankles; a set unit to set limit cycle control angles of the ankles on a three-dimensional space; and a control unit to control the set limit cycle control angles on the three-dimensional space using a sinusoidal function and thus control the angles of the ankles within a limit cycle using the sinusoidal function.

The set unit may set the limit cycle control angles in consideration of position, direction, tilt data of the robot on the three-dimensional space to balance the robot.

The control unit may control the limit cycle control angles using the sinusoidal function such that the limit cycle forms a stable closed loop on the three-dimensional space.

The control unit may control the angles of the ankles within the limit cycle by controlling the limit cycle control angles using the sinusoidal function.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF EMBODIMENTS

Figure 1:
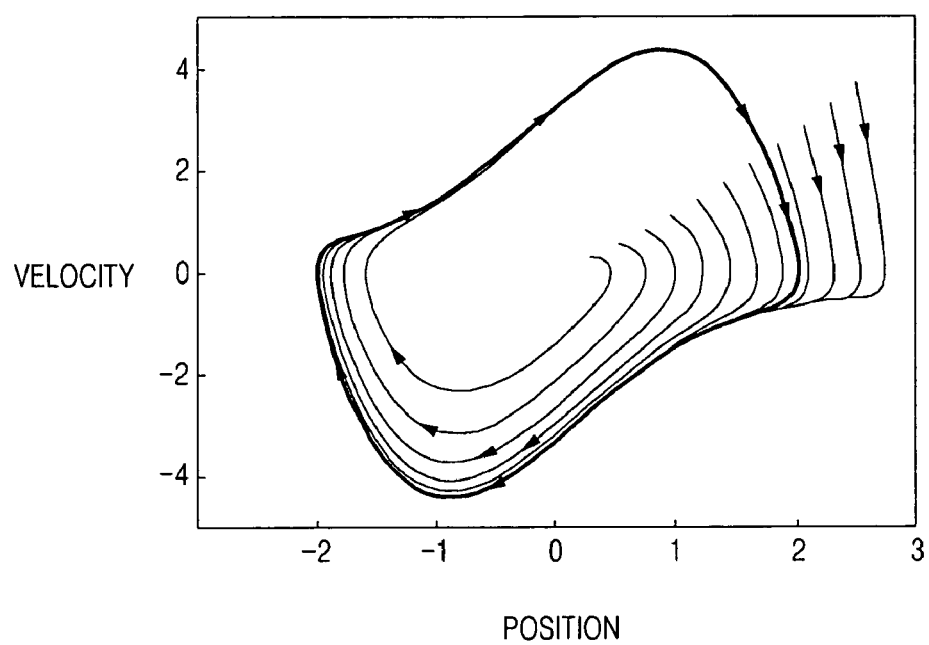
FIG. 1 is a view illustrating the concept of a limit cycle applied to the present invention.

Reference will now be made in detail to the embodiment of the present invention, an example of which is illustrated in the accompanying drawings, wherein like reference numerals refer to like elements throughout. The embodiment is described below to explain the present invention by referring to the annexed drawings.

Figure 2:
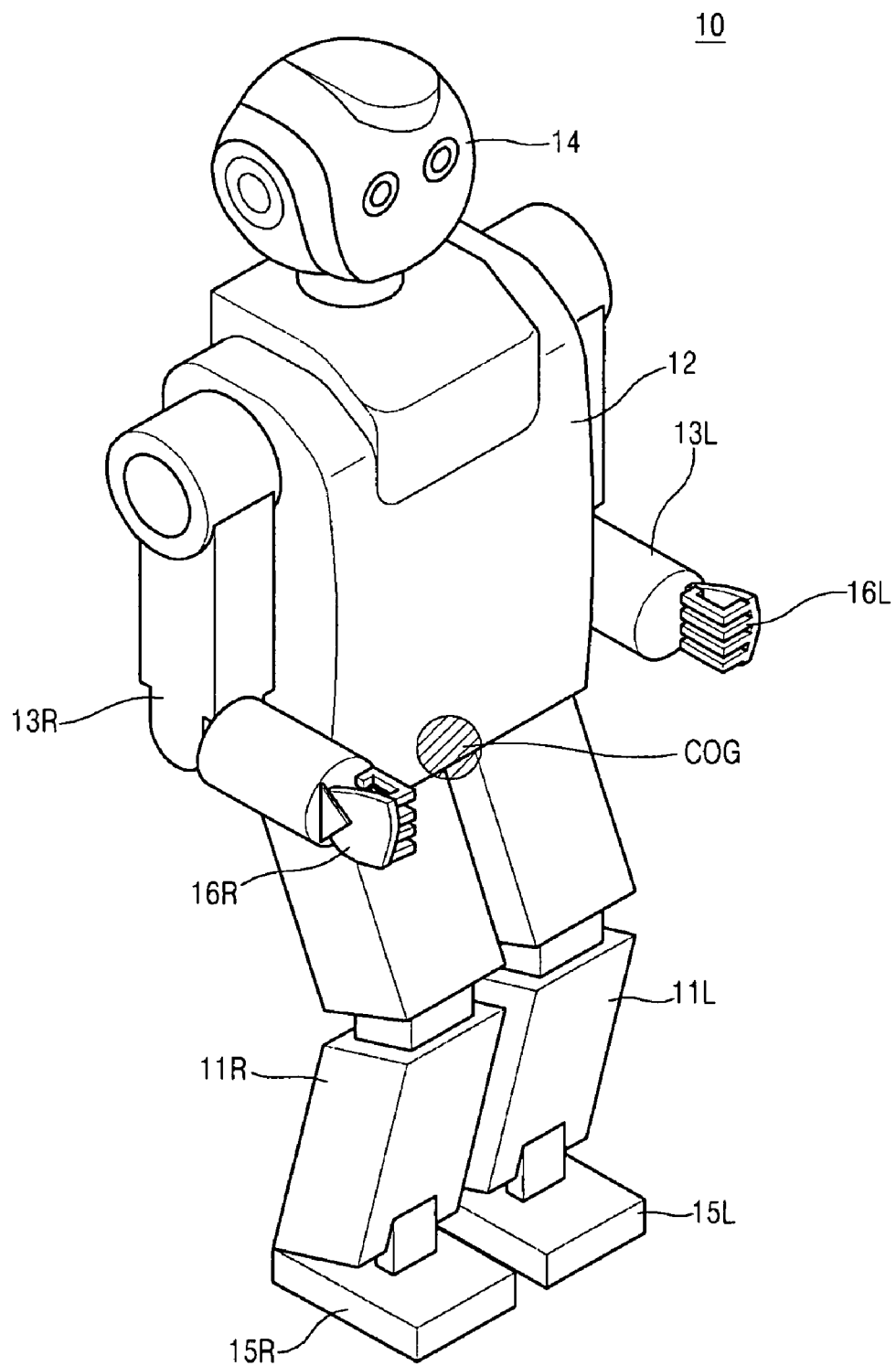
FIG. 2 is a schematic view illustrating the external appearance of a robot in accordance with an embodiment of the present invention.

FIG. 1 is a view illustrating the concept of a limit cycle applied to the present invention and FIG. 2 is a schematic view illustrating the external appearance of a robot in accordance with an embodiment of the present invention.

In FIG. 2, a robot 10 in accordance with this embodiment is a biped walking robot, which walks upright with two legs 11R and 11L in the same way as a human being, and includes a torso 12, two arms 13R and 13L and a head 14 provided at the upper portion of the torso 12, and feet 15R and 15L and hands 16R and 16L respectively provided at tips of the two legs 11R and 11L and the two arms 13R and 13L.

Here, R represents the right side of the robot 10, L represents the left side of the robot 10, and COG represents the center of gravity of the robot 10.

Figure 3:
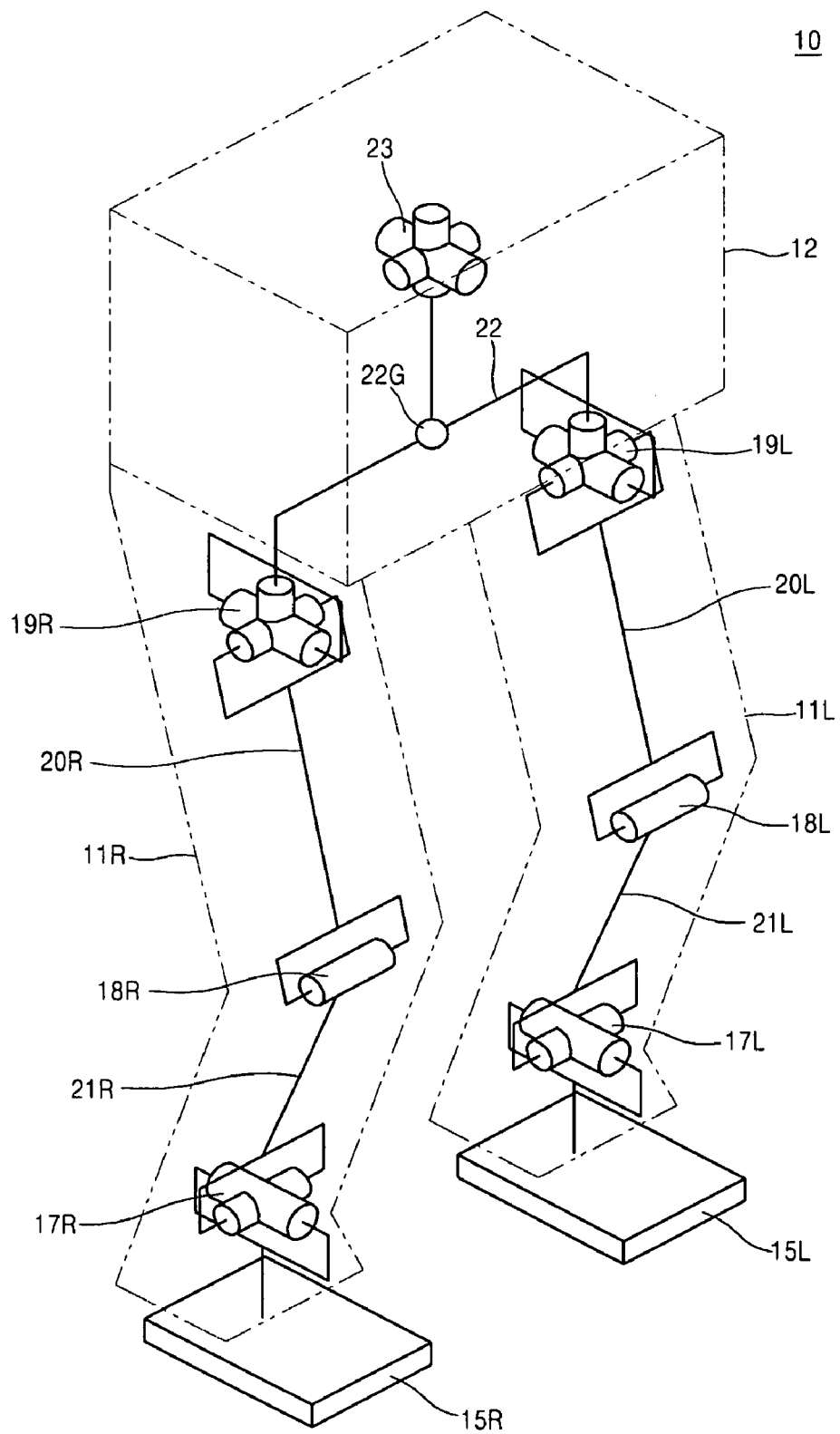
FIG. 3 is a view illustrating structures of main joints of the robot of FIG. 2.

FIG. 3 is a view illustrating structures of main joints of the robot of FIG. 2.

In FIG. 3, the two legs 11R and 11L respectively include ankle joints 17R and 17L, knee joints 18R and 18L, and hip joints 19R and 19L, such that parts of the robot 10 corresponding to ankles, knees, and hips are rotatable, and the hip joints 19R and 19L are located at both sides of the lower portion of the torso 12 connected with the two legs 11R and 11L.

The ankle joints 17R and 17L of the respective legs 11R and 11L are movable in the directions of the X-axis (roll axis) and the Y-axis (pitch axis), the knee joints 18R and 18L of the respective legs 11R and 11L are movable in the direction of the Y-axis (pitch axis), and the hip joints 19R and 19L of the respective legs 11R and 11L are movable in the directions of the X-axis (roll axis), the Y-axis (pitch axis), and the Z-axis (yaw axis).

Further, the two legs 11R and 11L respectively include thigh links 20R and 20L connecting the hip joints 19R and 19L and the knee joints 18R and 18L, and calf links 21R and 21L connecting the knee joints 18R and 18L and the ankle joints 17R and 17L, and thus have a designated degree of freedom according to the movements of the respective joints 17R, 17L, 18R, 18L, 19R, and 19L.

The torso 12 connected with the two legs 11R and 11L includes a waist joint 23 such that a part of the robot 10 corresponding to a waist is rotatable, and the waist joint 23 is located coaxially with the center 22G of a hip link 22 connecting the hip joints 19R and 19L located at both sides of the lower portion of the torso 12, i.e., the center of gravity COG of the robot 10, and thus is movable in the directions of the X-axis (roll axis), the Y-axis (pitch axis), and the Z-axis (yaw axis).

Each of the joints 17R, 17L, 18R, 18L, 19R, 19L, and 23 of the robot 10 includes an actuator (not shown, for example, a driving device, such as a motor) to drive the corresponding joint.

Figure 4:
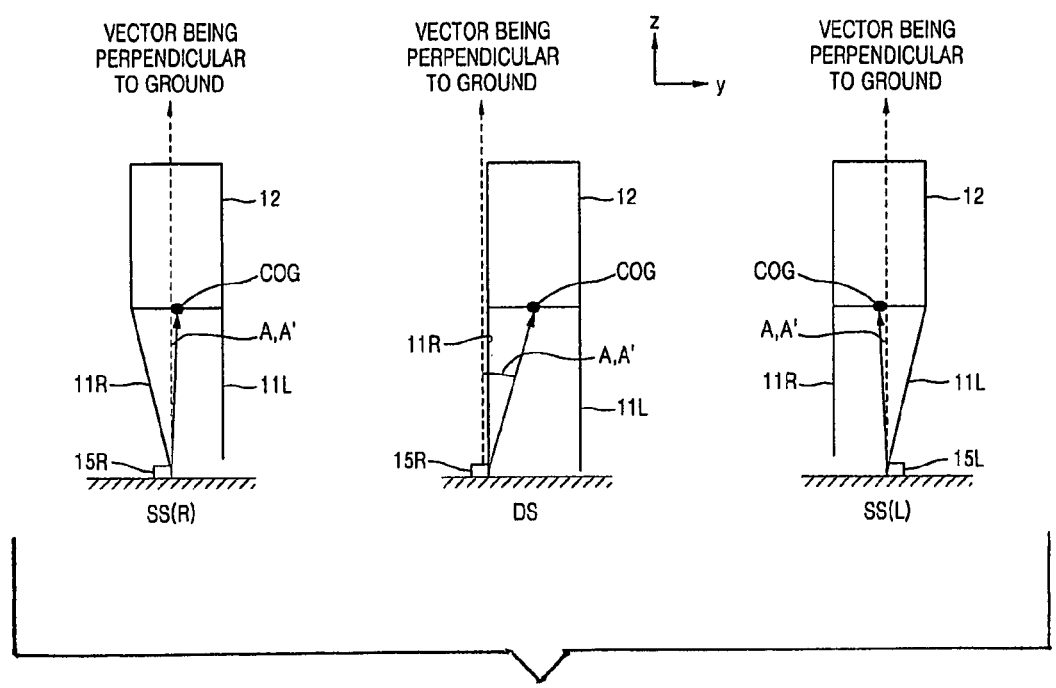
FIG. 4 is a view illustrating limit cycle control angles of an FSM-based robot in accordance with the embodiment of the present invention, defined on a two-dimensional space.

FIG. 4 is a view illustrating limit cycle control angles of an FSM-based robot in accordance with the embodiment of the present invention, defined on a two-dimensional space, i.e., respectively illustrating the torso 12 and the right and left legs 11R and 11L of the robot 10 on a Y-Z plane (two-dimensional space) formed by the Y-axis (pitch axis) and the Z-axis (yaw axis), modeled on the figure of a human, in which both feet alternately swing, when the human walks forward.

In FIG. 4, there are three states of the FSM-based robot 10, i.e., a double support (hereinafter, is referred to as 'DS') state, in which the robot 10 is supported with both feet thereof, a single support right (hereinafter, is referred to as 'SS(R)') state, in which the robot 10 is supported only with its right foot, and a single support left (hereinafter, is referred to as 'SS(L)') state, in which the robot 10 is supported only with its left foot, and a finite state machine (FSM) is characterized in that these states are regularly repeated.

When the FSM-based robot 10 balances itself, the curve of the limit cycle should be located in a stable region at any time. The robot 10 can stably balance itself right and left when the curve of the limit cycle forms the closed loop at any time without converging into one point or diverging. Therefore, when the robot 10 repeats the swing of one foot 15R or 15L and the swing of the other foot 15L or 15R, the limit cycle should form the closed loop at any time in order to form the stable region.

When the limit cycle is applied to the FSM-based robot 10 to balance the FSM-based robot 10 right and left on a two-dimensional space, the FSM-based robot 10 is balanced not by making contact of two feet 15R and 15L with the ground, but by alternately swinging both feet 15R and 15L.

A represents a control angle, at which the robot 10 can balance itself on a two-dimensional space using the limit cycle, and is defined as an angle between a vector, which is perpendicular to the ground, and a vector, which comes up to the center of gravity of the robot 10, from a contact point of the robot 10 with the ground (i.e., the sole of the foot of the supporting leg). The control angle A arises from the contact point of the robot 10 with the ground, and thus controls the ankle joints 17R and 17L of the robot 10. Further, A' represents a control angular velocity, which is a differential component of the control angle A.

As shown in FIG. 4, the control angle A and the control angular velocity A' in the DS state are maximum, and the control angle A and the control angular velocity A' in the SS(R) or SS(L) state are minimum. Therefore, when the relationships between the control angles A and the control angular velocities A' in the DS state and the SS(R) or SS(L) state are applied to the limit cycle, the robot 10 can balance itself by alternately swinging its legs 15R and 15L.

FIG. 4 shows control angles A, at which the robot 10 can balance itself using the limit cycle on a two-dimensional space. The control angles A of the robot 10 on the two-dimensional space cannot be used on a three-dimensional space, where the robot 10 actually walks. The reason is that there is no data regarding position (in the direction of the X-axis), direction (in the direction of the Z-axis), and tilt (in the direction of the Y-axis) of the robot 10 on the two-dimensional space and the control angles A on the two-dimensional space are defined on the assumption that the respective joints 17R, 17L, 18R, 18L, 19R, and 19L are located on one plane. Therefore, it is necessary to define limit cycle control angles B2 on the three-dimensional space, in consideration of data regarding position (in the direction of the X-axis), direction (in the direction of the Z-axis), and tilt (in the direction of the Y-axis) of the robot 10 on the three-dimensional space and the fact that the respective joints 17R, 17L, 18R, 18L, 19R, and 19L are not located on one plane.

Figure 5A:
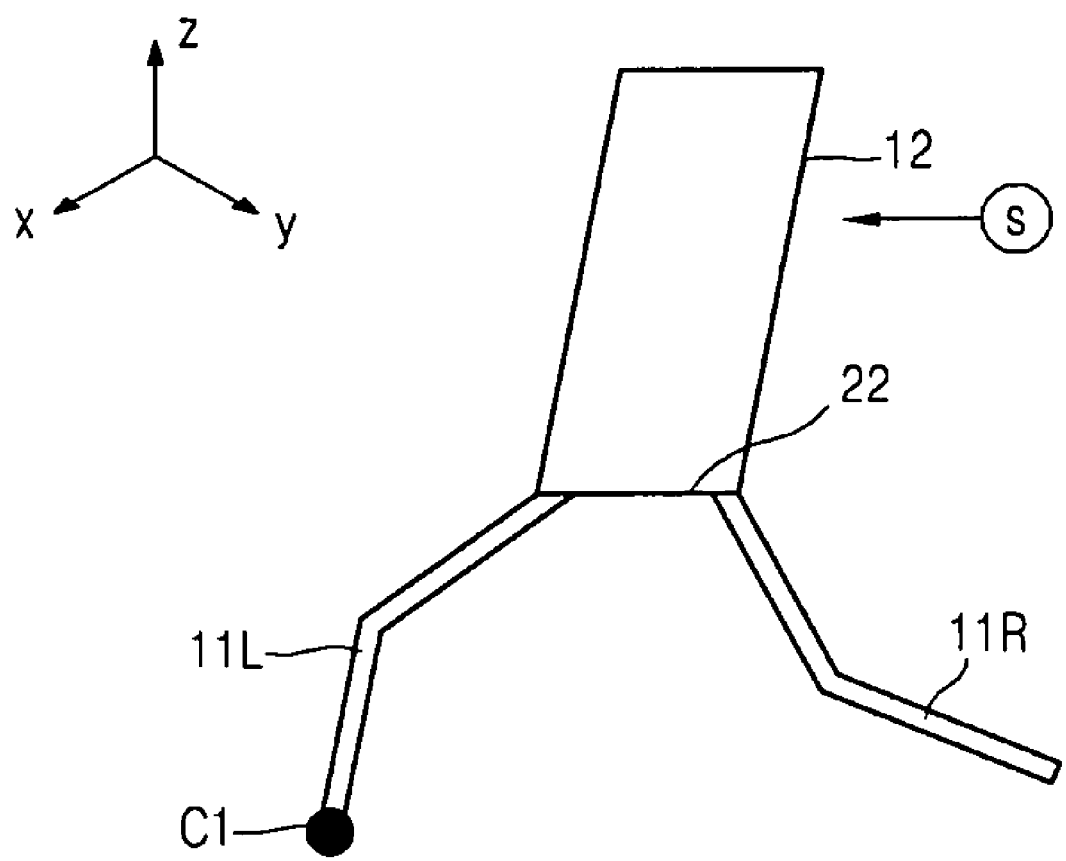
FIG. 5A is a view illustrating the FSM-based robot in accordance with the embodiment of the present invention on a three-dimensional space.

FIG. 5A is a view illustrating the FSM-based robot 10 in accordance with the embodiment of the present invention on a three-dimensional space, and more particularly, illustrating the torso 12 and the right and left legs 11R and 11L of the robot 10 on an X-Y-Z plane representing position (in the direction of the X-axis), direction (in the direction of the Z-axis), and tilt (in the direction of the Y-axis) of the robot 10.

Figure 5B:
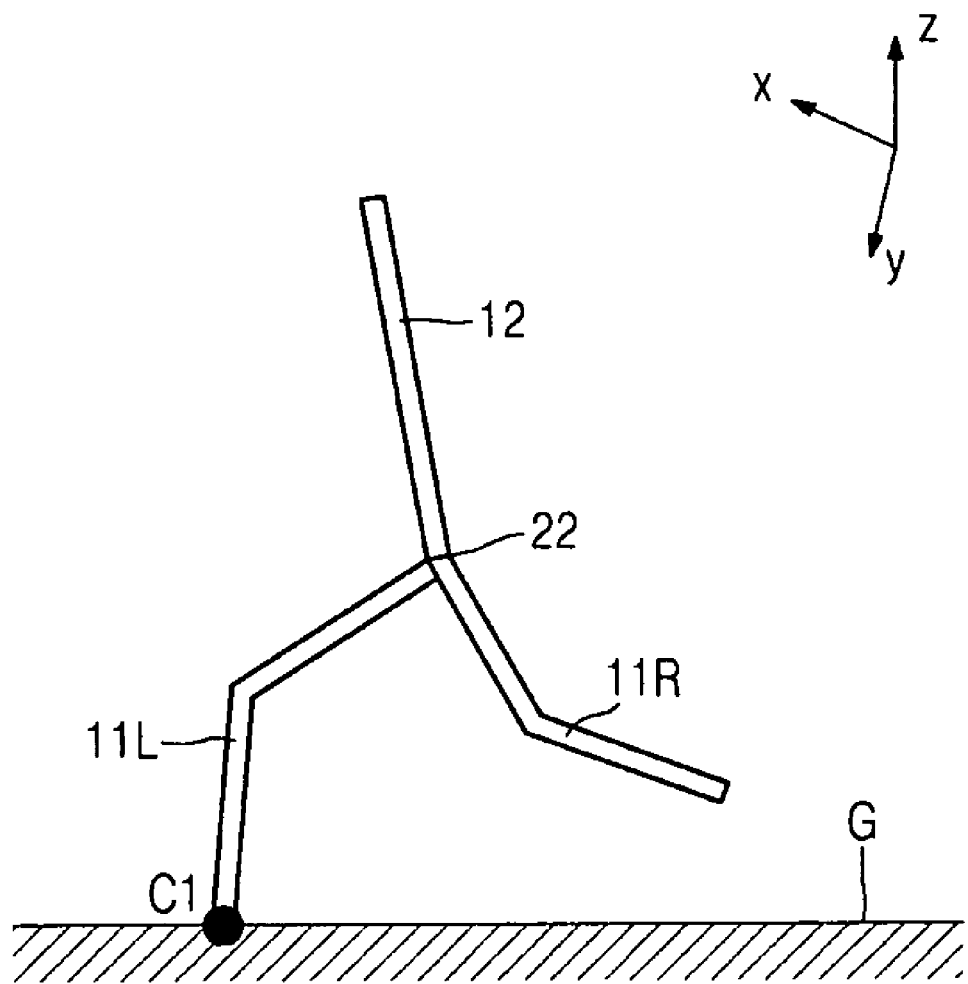
FIG. 5B is a view illustrating the FSM-based robot of FIG. 5A, viewed in the direction $\widehat{s}$.

FIG. 5B is a view illustrating the FSM-based robot 10 of FIG. 5A, viewed in the direction 'S', and more particularly illustrating a contact point C1 of the robot 10 with the ground G (hereinafter, referred to as a contact point with the ground G) when the left leg 11L is a supporting leg and the right leg 11R is a swing leg.

Hereinafter, a process of defining a limit cycle control angle B2 of the robot 10 in accordance with the embodiment of the present invention on a three-dimensional space will be described.

In order to describe this embodiment, it is assumed that position data regarding a random point of the robot 10 (for example, an edge point of the torso or the hip link) on a three-dimensional space and position data regarding the center of gravity COG of the robot 10 are known. The position data regarding the random point of the robot 10 (for example, the edge point of the torso or a hip link) are obtained using kinematics characteristics of the robot 10 and various sensor data, and the position data regarding the center of gravity COG of the robot 10 are obtained using weight data of the respective links 20R, 20L, 21R, and 21L and position data of the respective joints 17R, 17L, 18R, 18L, 19R, and 19L.

Figure 6A:
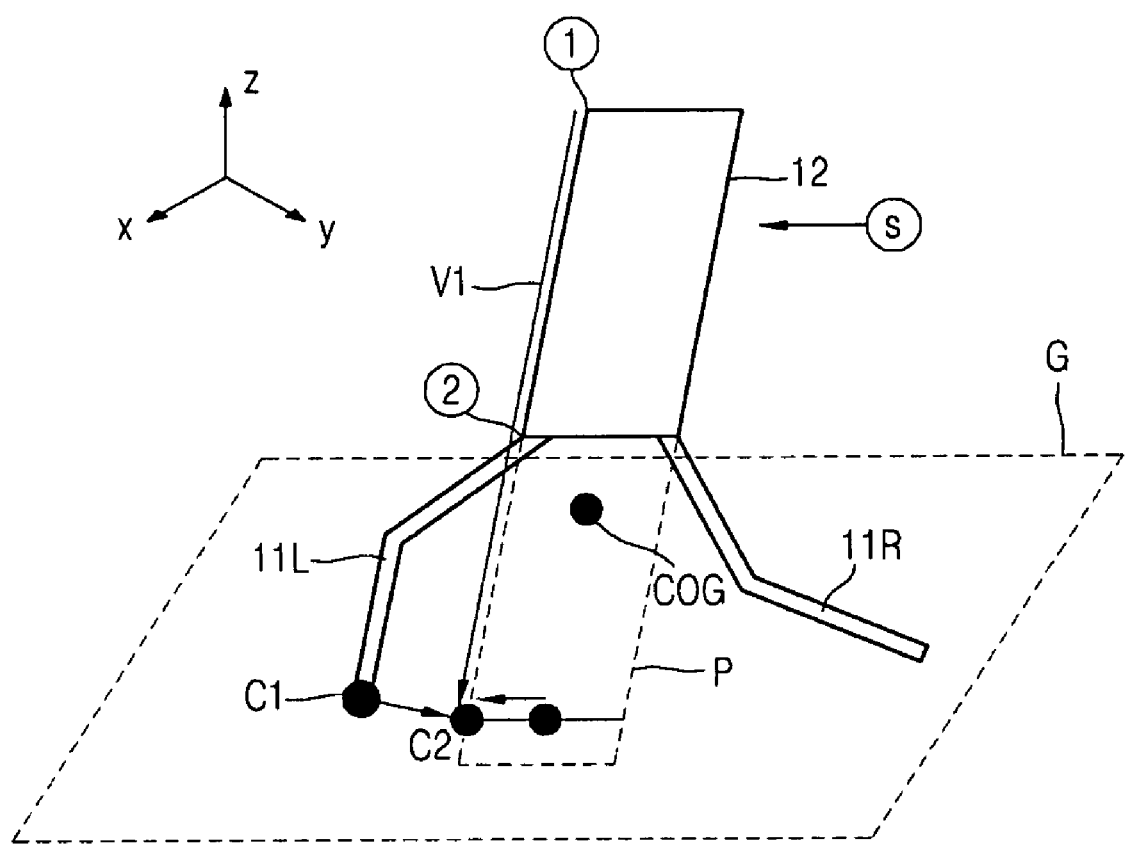
FIG. 6A is a view illustrating the FSM-based robot of FIG. 5A on a virtual plane on the basis of the torso of the robot.
Figure 6B:
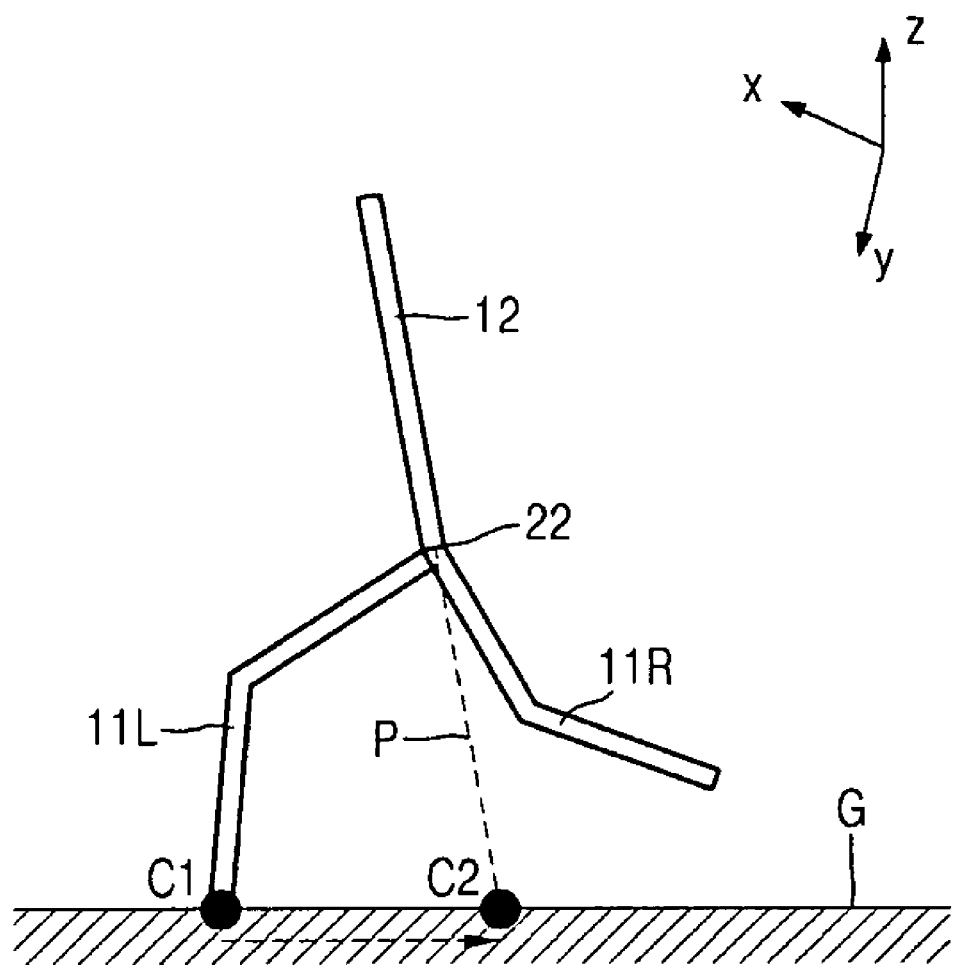
FIG. 6B is a view illustrating the FSM-based robot of FIG. 5B on the virtual plane on the basis of the torso of the robot.

FIG. 6A is a view illustrating the FSM-based robot of FIG. 5A on a virtual plane on the basis of the torso of the robot, and FIG. 6B is a view illustrating the FSM-based robot of FIG. 5B on the virtual plane on the basis of the torso of the robot. This virtual plane is a robot plane P, which can express both position and direction data of the robot 10.

In FIGS. 6A and 6B, when the contact point C1 with the ground is deviated from the robot plane P due to the left leg 11L (the link) being deviated from the robot plane P, the contact point C1 with the ground is projected on the robot plane P and thus is used as data on the robot plane P. When a spatial first vector V1 is generated using the position of an edge point '1' of the torso 12 and the position of an edge point '2' of the hip link 22, and then the spatial first vector V1 is extended, the position of a point C2 contacting the ground G is obtained. This point (hereinafter, is referred to the contact point on the robot plane P) C2 is a point obtained by projecting the contact point C1 with the ground G, which is located outside the robot plane P, onto the robot plane P.

Figure 7:
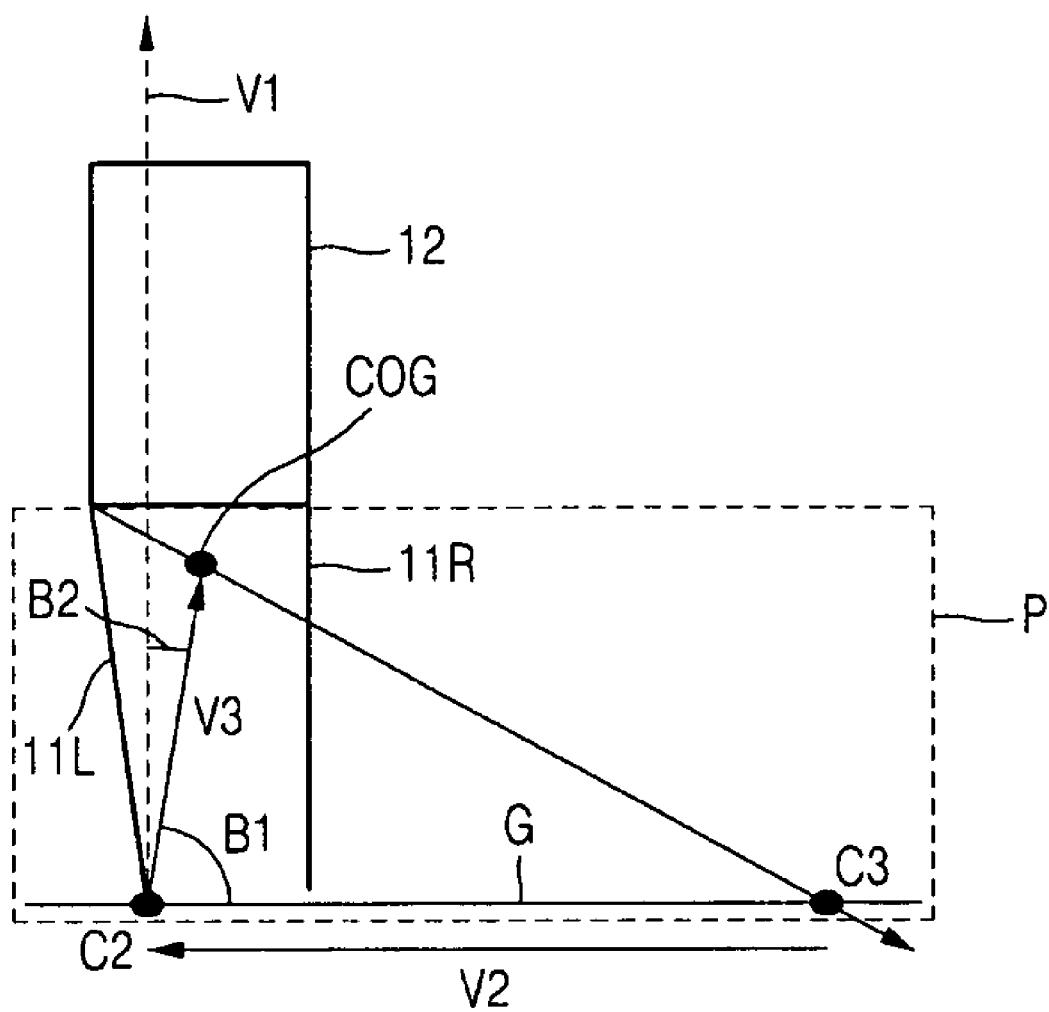
FIG. 7 is a view illustrating a limit cycle control angle of the FSM-based robot in accordance with the embodiment of the present invention, defined on a three-dimensional space.

FIG. 7 is a view illustrating a limit cycle control angle of the FSM-based robot in accordance with the embodiment of the present invention, defined on a three-dimensional space.

In FIG. 7, when the hip point '2' (FIG. 6A) at the leg 11L contacting the robot plane P and the center of gravity COG are extended using positions of the two points, the position of a point C3 meeting the ground is obtained. This point (hereinafter, is referred to the contact point on a space) C3 is a point obtained by projecting the contact point C1 with the ground G, which is located outside the robot plane P, onto the three-dimensional space.

When a spatial second vector V2 (z=0) is generated using the position data of the contact point C3 on the space and the contact point C2 on the robot plane P and the contact point C2 on the robot plane and the center of gravity COG are extended using positions of the two points, a spatial third vector V3 is generated.

When the dot product of the spatial second vector V2 and the spatial third vector V3 is calculated, an angle B1 between the spatial second vector V2 and the spatial third vector V3 is obtained. Then, when this angle B1 is subtracted from an angle of 90 degrees, an angle B2 (90-B1) between the spatial first vector V1 and the spatial third vector V3 is obtained. The obtained angle B2 is defined as a limit cycle control angle on the three-dimensional space.

The defined limit cycle control angle B2 expresses only a right and left tilt angle of the robot 10 on the robot plane P regardless of a forward tilt angle of the robot 10, and thus can be used to balance the robot 10 right and left.

Figure 8:
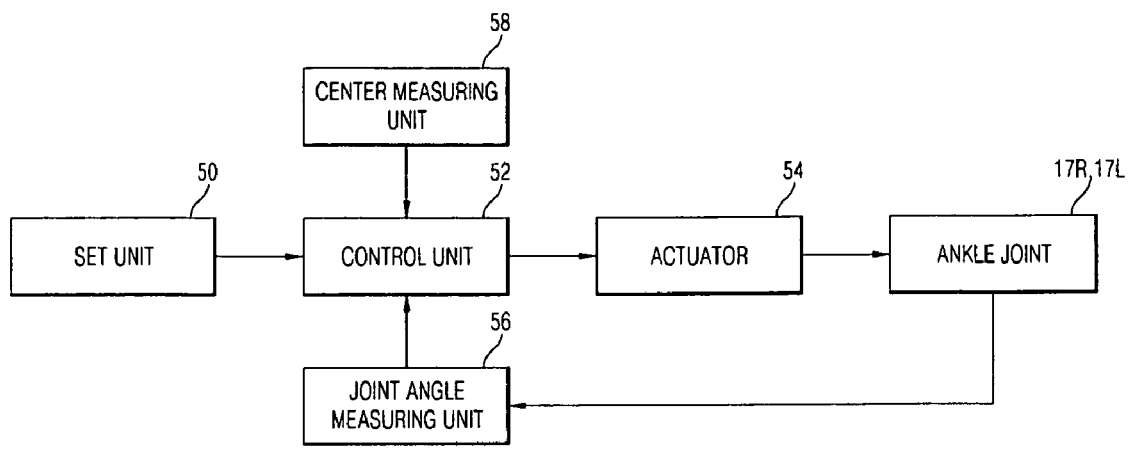
FIG. 8 is a control block diagram to balance the FSM-based robot in accordance with the embodiment of the present invention.

FIG. 8 is a control block diagram to balance the FSM-based robot in accordance with the embodiment of the present invention. The FSM-based robot includes a set unit 50, a control unit 52, actuators 54, a joint angle measuring unit 56, and a center measuring unit 58.

The set unit 50 sets the control angle B2 to use the limit cycle to balance the FSM-based robot 10 on the three-dimensional space. The set unit 50 sets the control angle B2, which corresponds to the state of the robot 10 to balance the robot 10 on the three-dimensional space (with reference to FIGS. 5A to 7).

The control unit 52 controls the limit cycle control angle B2, set on the three-dimensional space corresponding to the state of the robot 10, using a sinusoidal function, such that the relation between the limit cycle control angle B2 and a limit cycle control angular velocity B2' forms a circular/elliptical limit cycle, which is stable on a three-dimensional space, and thus the FSM-based robot 10 can balance itself right and left. As one method of various methods of forming the limit cycle in a closed loop, the relation between the limit cycle control angle B2 and its differential component, i.e., the control angular velocity B2', forms a stable circular/elliptical limit cycle using the sinusoidal function. When this limit cycle is used as an algorithm to balance the robot 10 right and left, the robot 10 can balance itself stably.

The method of controlling the limit cycle control angle B2 using the sinusoidal function is represented by the below expressions 1 and 2.

Limit cycle control angle $B2 = B2\max \times \sin(\omega \times t)$    (Expression 1)

Limit cycle control angular velocity $B2' = B2\max \times \omega \times \cos(\omega \times t)$    (Expression 2)

Here, B2max is a designated value, ω is a conversion cycle (control cycle) of the limit cycle control angle B2, and t is time.

Each of the actuators 54 drives the ankle joint 17R or 17L, a target angle of which forms the limit cycle, when the control unit 52 controls the limit cycle control angle B2 set on the three-dimensional space corresponding to the state of the robot 10 using the sinusoidal function, according to a torque control signal of the control unit 52 such that the angle of the ankle joint 17R or 17L does not deviate from the limit cycle.

The joint angle measuring unit 56 measures the angle of the ankle joint 17R or 17L moving according to the driving of the actuator 54, and transmits the measured angle to the control unit 52. The joint angle measuring unit 56 is a control factor, which feeds the angle of the ankle joint 17R or 17L back to the control unit 52 to follow the limit cycle control angle B2 set by the set unit 50.

The center measuring unit 58 measures the position of the center of gravity COG of the robot 10, which is varied according to the states of the robot 10, and transmits the measured position of the center of gravity COG of the robot 10 to the control unit 52. The center measuring unit 58 is a control factor, which feeds the position of the center of gravity COG of the robot 10 back to the control unit 52 to follow the limit cycle control angle B2 set by the set unit 50.

As is apparent from the above description, in the embodiment of the present invention, when the limit cycle control angle B2 of the robot 10 are defined such that angles of the ankle joints 17R and 17L to be controlled to balance the FSM-based robot 10 right and left during walking form a closed loop, angles defined on a two-dimensional simulation cannot be used on a three-dimensional simulation. Therefore, when the control angles B2 required to balance the robot 10 right and left regardless of position and tilt of the robot 10 on the three-dimensional simulation are defined and controlled using the sinusoidal function, the limit cycle balance algorithm can be used even on the three-dimensional simulation.

In accordance with one embodiment of the present invention, in order to balance an FSM-based biped robot on a three-dimensional space, limit cycle control angles to balance the robot according to states of the FSM-based biped robot are set on the three-dimensional space, and the limit cycle control angles on the three-dimensional space are controlled using a sinusoidal function to allow the relationship between the control angles and control angular velocities to form a stable closed loop within a limit cycle, thereby allowing the biped robot to balance itself while changing its supporting foot and thus safely walk without falling down.

Although an embodiment of the invention has been shown and described, it would be appreciated by those skilled in the art that changes may be made in this embodiment without departing from the principles and spirit of the invention, the scope of which is defined in the claims and their equivalents.

What is claimed is:

1. A method of controlling a robot comprising:
   setting limit cycle control angles to balance the robot on a three-dimensional space; and
   controlling the set limit cycle control angles on the three-dimensional space comprising using a sinusoidal function to balance the robot within a limit cycle,
   wherein the setting of the limit cycle control angles includes
      defining a virtual plane on the basis of a torso of the robot, and generating a contact point on the virtual plane comprising projecting a contact point of the robot with the ground onto the virtual plane;
      generating a contact point on the space comprising using positions of the contact point on the virtual plane and a center of gravity of the robot;
      generating vectors on the space comprising using positions of the contact point on the space, the contact point on the virtual plane, and the center of gravity; and
      obtaining the limit cycle control angles comprising using the generated vectors on the space.

2. The method according to claim 1, wherein the robot is a finite state machine (FSM)-based biped walking robot.

3. The method according to claim 2, wherein the setting the limit cycle control angles comprises setting in consideration of position, direction, or tilt data of the robot according to states of the FSM.

4. The method according to claim 3, wherein the states of the FSM include a double support (DS) state, in which the robot is supported with both feet thereof, a single support right (SS(R)) state, in which the robot is supported only with a right foot thereof, and a single support left (SS(L)) state, in which the robot is supported only with a left foot thereof.

5. The method according to claim 4, wherein the control of the limit cycle control angles using the sinusoidal function comprises forms a stable closed loop according to the states of the FSM with the limit cycle.

6. The method according to claim 5, wherein the controlling of the limit cycle control angles using the sinusoidal function comprises forming relations of the limit cycle control angles and control angular velocities, which are differential components of the limit cycle control angles, in the stable closed loop on the space.

7. The method according to claim 6, further comprising controlling the angles of the ankles of the robot within the limit cycle comprising controlling the limit cycle control angles using the sinusoidal function.

8. The method according to claim 1, wherein the contact point on the virtual plane and the contact point on the space correspond to the contact point of the robot with the ground.

9. The method according to claim 8, wherein the limit cycle control angles arise from the contact point of the robot with the ground, and control ankles of the robot.

10. The method according to claim 9, further comprising controlling the angles of the ankles with the limit cycle control angles to allow the limit cycle to form a stable closed loop.

11. A robot comprising:
    a plurality of ankles;
    a set unit to set limit cycle control angles of the ankles on a three-dimensional space; and
    a control unit to control the set limit cycle control angles on the three-dimensional space using a sinusoidal function and thus control the angles of the ankles within a limit cycle using the sinusoidal function, wherein control unit controls the set limit cycle control angles by defining a virtual plane on the basis of a torso of the robot, generating a contact point on the virtual plane by projecting a contact point of the robot with the ground onto the virtual plane, generating a contact point on the space by using positions of the contact point on the virtual plane and a center of gravity of the robot, generating vectors on the space by using positions of the contact point on the space, the contact point on the virtual plane, and the center of gravity, and obtaining the limit cycle control angles by using the generated vectors on the space.

12. The robot according to claim 11, wherein the robot is a finite state machine (FSM)-based biped walking robot.

13. The robot according to claim 12, wherein the set unit sets the limit cycle control angles in consideration of position, direction, or tilt data of the robot on the three-dimensional space to balance the robot.

14. The robot according to claim 13, wherein the control unit controls the limit cycle control angles using the sinusoidal function such that the limit cycle forms a stable closed loop on the three-dimensional space.

15. The robot according to claim 14, wherein the control unit controls the angles of the ankles within the limit cycle by controlling the limit cycle control angles using the sinusoidal function.

* * * * *